Jan. 7, 1964 H. W. WHITMORE 3,116,610
METHOD FOR PRESERVING FRESH FOODS
Original Filed Aug. 31, 1959
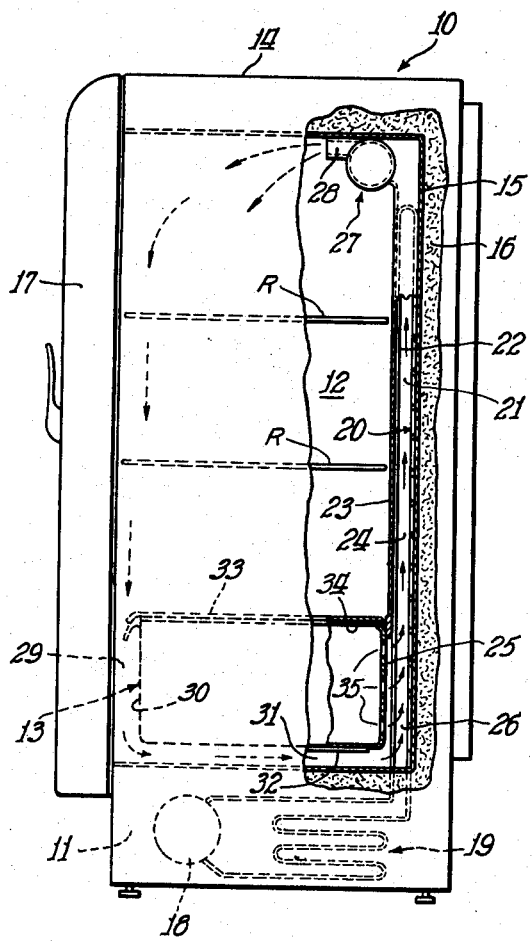
Inventor:
Harland W. Whitmore
By:

he present application is a division of Serial No. 836,971, which was filed August 31, 1959, now Patent No. 3,067,588.

3,116,610
METHOD FOR PRESERVING FRESH FOODS

Harland W. Whitmore, Grand Haven, Mich., assignor to Borg-Warner Corporation, a corporation of Illinois
Original application Aug. 31, 1959, Ser. No. 836,971. Divided and this application Aug. 15, 1962, Ser. No. 224,881
3 Claims. (Cl. 62—100)

The present application is a division of Serial No. 836,971, which was filed August 31, 1959, now Patent No. 3,067,588.

This invention relates to the preservation of foods and more particularly to preserving fresh foods, such as vegetables and fruits, in refrigerators.

It is well known that preservation of fresh foods, particularly vegetables and fruits, is accomplished by cooling such foods in a storage receptacle in a refrigerator compartment, the receptacle being closed to prevent loss of the moisture content of the food, which would occur in the event the foods are exposed to the cold comparably dry atmosphere of the refrigerator compartment. While preservation of fruits and vegetables in food storage receptacles in refrigerators prevents rapid deterioration, it has been established that the satisfactory storage life of such foods, and particularly green vegetables, such as lettuce, will be extended if the receptacle interior is maintained under partial vacuum.

It is an object of the invention to provide a novel method and means for preserving fresh foods, such as vegetables and fruits, in a closed refrigerator storage receptacle by reducing the air pressure in the receptacle to produce a partial vacuum in the receptacle.

Another object of the invention is to provide a novel method and means for preserving fresh foods, such as fruits and vegetables, in a closed storage receptacle by circulating cooling air about the receptacle to cool the receptacle and its contents while causing the circulating air to flow past an opening in the receptacle to effect the reduction of air pressure, and thereby create a partial vacuum within the receptacle.

Another object of the invention is to provide a novel method and means for preserving fresh foods, such as fruits and vegetables, by circulating cooling air about a containing receptacle, the receptacle having an access opening closed by a cover in hermetic sealing relation to the receptacle, and the receptacle having an opening in a wall thereof parallel to the flow of the cooling air to provide a Venturi effect to reduce the air pressure within the receptacle and thereby cause a partial vacuum in the receptacle.

A further object of the invention is to provide a novel method and means for preserving fresh foods, such as fruits and vegetables, in a closed receptacle by disposing the receptacle within the general food storage compartment of a refrigerator having a forced cooling air circulating system, including a fan for causing cool air to flow through an air duct to cool the compartment and receptacle; the receptacle having a wall forming a portion of the air duct and being provided with a vent opening communicating with the intake or suction side of the fan to reduce the air pressure in the receptacle to approximately the pressure on the suction side of the fan and thereby create a partial vacuum in the receptacle effective to extend the satisfactory storage life of the fruits and vegetables within the receptacle.

Further objects and advantages of the present invention will be apparent from the following description, reference being had to the accompanying drawing, wherein a preferred form of the present invention is shown.

In the drawing:

The single FIGURE shown in the drawing is a vertical sectional view of a refrigerator having a food storage compartment cooled by a forced refrigerated air circulation system, the compartment including a fresh foods storage receptacle which, in conjunction with the forced air circulation system, illustrates an embodiment of the invention.

Referring now to the drawing wherein a preferred embodiment of the invention has been shown, a household refrigerator generally designated 10 is provided with a motor-compressor compartment 11, and a food storage compartment 12, containing a closed fresh foods-storage receptacle or container 13. The refrigerator comprises the usual sheet metal outer shell 14 which serves to support an inner liner element 15 forming the food compartment, suitable insulation 16 being provided between the outer shell 14 and the inner liner 15. A door 17 is provided to permit access to the food storage compartment 12.

The refrigeration system used for cooling the compartment 12 consists of the usual motor-compressor unit 18 which is preferably of the well-known hermetically sealed rotary type. The compressed refrigerant, leaving the compressor 18, flows into a condenser 19 from whence the liquid refrigerant flows through a conventional fixed restrictor type of pressure reducing device (not shown) serving to convey the liquified refrigerant into an evaporator 20 mounted in an air flue or duct 21 at the back of the food storage compartment 12 and serves to cool the food storage compartment in a manner to be explained more fully hereinafter. The outlet of the evaporator 20 is connected to the inlet of the motor-compressor unit by means of the usual suction or return line 22. It will be observed that the evaporator 20 and the return line 22 are mounted within a vertically elongate air flue or duct 21 which may be rectangular in cross section, provided by a rear wall forming a portion of the back wall of the liner 20; a front wall 23; and two side walls, one of which is shown at 24. The wall 23 extends substantially the length of the food storage compartment terminating at its lower end below the top of the receptacle 13, the back wall 25 of the receptacle in conjunction with the side walls 24 of the duct and the back wall of the inner liner 20 serves to form a lower extension 26 or continuation of the air duct 21 so that cooling air can flow through this extension along the rear wall of the receptacle 22 into the air flue or duct 21.

A fan of the squirrel cage type, generally indicated at 27, is mounted in an horizontal extension 28 of the air duct 21 at its upper end for forcefully circulating air through the duct so as to cool the air and then discharge it forwardly into the compartment 12. Thereafter, the cool air flows downwardly in thermal exchange relationship with any food stored on conventional wire racks R in the food storage compartment 12, the air also circulating through the passage 29 formed by the front wall 30 of the food-storage receptacle 13 and door 17 and through an air duct 31 at the bottom of the food storage compartment 12 and provided by the bottom wall of the inner liner 15 and a vertically spaced plate 32 connected to the side walls of the liner 15 and providing a support for the receptacle 13. The air duct or flue 31 serves to guide the flow of air into the duct 26 along the rear wall 25 of the receptacle 13, the air then flowing into the duct 21 for recirculation by the fan 27. The described path of the circulating refrigerated air is clearly shown and indicated by the arrows and it will be obvious that the air, cooled by the evaporator 20, flows through the duct 21 to the intake or suction side of the fan 27, the fan ejecting the air into the refrigerator compartment 12, and the air then circulating through the passage 29 between the door and the front wall of the receptacle and through the duct 31 and into the duct 26 between the rear wall of the receptacle 13 and the inner liner 15.

The fresh foods-storage receptacle 13 may be of rectangular form, with the sides thereof being spaced from the side walls of the liner 15, with the rear wall 25, as previously described being spaced from the rear wall of the liner 15 to provide the duct 26 for causing the air to flow along the rear wall of the receptacle 13. The receptacle 13 has its open top closed by a cover 33 provided with a rubber gasket 34 serving to provide a hermetic seal between the cover and the top of the receptacle 13.

It will be apparent from the foregoing description that the storage receptacle 13 is located in the path of the air circulating in and around it to cause the fresh foods, such as fruits and vegetables, to be cooled by refrigeration for preserving such foods. It has been established that fresh foods and particularly green vegetables, such as lettuce, will be more effectively preserved against deterioration in such receptacles if the receptacle interior is maintained under vacuum. The present invention is directed to utilizing the flow of the circulating forced cool air to not only cool the fresh foods but to induce a sufficient decrease of the air pressure within the receptacle 13 to provide a partial vacuum within the receptacle 13 and thereby increase the period of freshness of the foods within the receptacle 13. For this purpose, the receptacle 13 is provided with the hermetic seal between the cover 33 and the receptacle 13 afforded by the gasket 34, and the rear wall 25 of the receptacle 13 is provided with a plurality of openings 35 so that the receptacle is vented to the air duct 26 of the forced air circulating system. As the ducts 26 and 21 are connected to the intake or suction side of the pan 27, the effect of the air flowing past the openings or vents 35 in the rear wall 25 of the receptacle 13 provides a Venturi effect for reducing the pressure of the air inside the receptacle. As the vents 35 are open to the suction side of the fan through a tight air intake duct, the velocity of the flow of the air past the vents causes the air pressure in the receptacle 13 to decrease and approximate the air pressure on the suction side of the fan. Accordingly, as this arrangement effects a decrease of the air pressure within the receptacle 13, a partial vacuum is formed in the receptacle 13 for more effectively preserving the freshness of the foods contained within the receptacle 13.

It will be apparent that my improved method and means for the better preservation of fresh foods requires very little changes to be made in the conventional refrigerator of the forced air system type due to the novel employment of the forced air circulation arrangement to not only provide for the refrigeration of the foods commonly stored in the compartment of the refrigerator including the fresh foods receptacle, but to utilize the same forced air circulation to induce a partial vacuum in the fresh foods receptacle to extend the satisfactory storage time period of the fresh foods.

While a particular embodiment of my invention has been illustrated and described, my invention is not to be limited to the particular construction shown and described as it is intended that the appended claims will cover all modifications within the scope of my invention.

What is claimed is:

1. The method of preserving fresh foods, such as vegetables and fruits, in a refrigerator having a forced refrigerated air circulation system for cooling foods disposed in a compartment thereof provided with supports for storing foods and having a closed container for fresh foods comprising the steps of forcing refrigerated air to flow through the compartment, to cool the foods on the supports and the fresh foods in the container, and past an opening in the container to reduce the air pressure in the container and thereby cause a partial vacuum in the container.

2. The method of preserving fresh foods, such as vegetables and fruits, in a refrigerator having a forced refrigerated air circulation system for cooling foods disposed in a compartment thereof provided with a closed container for fresh foods comprising the steps of forcibly circulating refrigerated air through the compartment in the refrigerator, to cool the foods therein, and including the fresh foods in the container, and about the container to withdraw air from the container through an opening therein to reduce the air pressure in the container and thereby cause a partial vacuum in the container.

3. The method of preserving fresh foods, such as vegetables and fruits, in a refrigerator having a forced refrigerated air circulation system, provided by an air-conveying duct with a cooling coil and fan therein, for cooling foods disposed in a compartment thereof having a closed fresh foods container having an opening located in the air-conveying duct comprising the steps of forcibly circulating refrigerated air through the duct and into and from the compartment thereof to cool the foods and past the opening in the closed receptacle to reduce the air pressure in the receptacle and thereby cause a partial vacuum in the receptacle.

References Cited in the file of this patent

UNITED STATES PATENTS

| | | |
|---|---|---|
| 2,894,845 | Stoddard | July 14, 1959 |
| 2,960,849 | O'Connell | Nov. 22, 1960 |
| 3,067,588 | Whitmore | Dec. 11, 1962 |